(12) United States Patent
van Riel

(10) Patent No.: US 10,198,370 B2
(45) Date of Patent: *Feb. 5, 2019

(54) MEMORY DISTRIBUTION ACROSS MULTIPLE NON-UNIFORM MEMORY ACCESS NODES

(71) Applicant: Red Hat, Inc., Raleigh, NC (US)

(72) Inventor: Henri van Riel, Merrimack, NH (US)

(73) Assignee: Red Hat, Inc., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/727,986

(22) Filed: Oct. 9, 2017

(65) Prior Publication Data

US 2018/0032452 A1 Feb. 1, 2018

Related U.S. Application Data

(63) Continuation of application No. 14/193,811, filed on Feb. 28, 2014, now Pat. No. 9,785,581.

(51) Int. Cl.
G06F 12/02 (2006.01)
G06F 13/16 (2006.01)

(52) U.S. Cl.
CPC ...... *G06F 13/1657* (2013.01); *G06F 12/0284* (2013.01); *G06F 13/1663* (2013.01); *G06F 12/0253* (2013.01); *G06F 2212/1024* (2013.01); *G06F 2212/2542* (2013.01)

(58) Field of Classification Search
None
See application file for complete search history.

(56) References Cited

U.S. PATENT DOCUMENTS

| | | |
|---|---|---|
| 6,049,854 A | 4/2000 | Bedarida |
| 7,647,454 B2 | 1/2010 | Aguilera et al. |
| 7,870,366 B2 | 1/2011 | Mitra et al. |
| 2007/0118712 A1 | 5/2007 | van Riel et al. |
| 2009/0228665 A1 | 9/2009 | van Riel et al. |
| 2011/0202699 A1 | 8/2011 | van Riel |

(Continued)

OTHER PUBLICATIONS

Arcangeli, "AutoNUMA", Red Hat, Inc., May 30, 2012 (27 pages).

(Continued)

*Primary Examiner* — Charles Rones
*Assistant Examiner* — Ryan Dare
(74) *Attorney, Agent, or Firm* — K&L Gates LLP

(57) ABSTRACT

A system, methods, and apparatus for determining memory distribution across multiple non-uniform memory access processing nodes are disclosed. An apparatus includes processing nodes, each including processing units and main memory serving as local memory. A bus connects the processing units of each processing node to different main memory of a different processing node as shared memory. Access to local memory has lower memory access latency than access to shared memory. The processing nodes execute threads distributed across the processing nodes, and detect memory accesses made from each processing node for each thread. The processing nodes determine locality values for the thread that represent the fraction of memory accesses made from the processing nodes, and determine processing time values for the threads for a sampling period. The processing nodes determine weighted locality values for the threads, and determine a memory distribution across the processing nodes based on the weighted locality values.

20 Claims, 4 Drawing Sheets

(56) References Cited

U.S. PATENT DOCUMENTS

2012/0278665 A1 11/2012 Serebryany et al.
2013/0138885 A1 5/2013 Kurtz et al.

OTHER PUBLICATIONS

Dole, "The MySQL swap insanity" problem and the effects of the NUMA architecture, Sep. 28, 2012 (printed on Feb. 28, 2014) from http://blog.jcole.us/2010/09/28/mysql-swap-insanity-and-the-numa-architecture/ (20 pages).
Corbet, "AutoNUMA: the other approach to NUMA scheduling", Mar. 27, 2012 (printed on Feb. 28, 2014) from hittp://lwn.net/Articles/488709 (4 pages).

|  | Memory Accesses From Node 0 | Memory Accesses From Node 1 | Memory Accesses From Node 2 |
| --- | --- | --- | --- |
| Worker Thread A | 1,000 | 0 | 0 |
| Worker Thread B | 20 | 1,000 | 0 |
| Worker Thread C | 1,000 | 400 | 0 |
| Grabage Collector Thread | 0 | 0 | 100,000 |
| Aggregate Per Node | 2,020 | 1,400 | 100,000 |

402

|  | Fraction of Thread Accesses From Node 0 | Fraction of Thread Accesses From Node 1 | Fraction of Thread Accesses From Node 2 |
| --- | --- | --- | --- |
| Worker Thread A | 100% | 0% | 0% |
| Worker Thread B | 2% | 98% | 0% |
| Worker Thread C | 71% | 29% | 0% |
| Grabage Collector Thread | 0% | 0% | 100% |
| Aggregate Per Node | 173% | 127% | 100% |

404

|  | CPU Time Used During Measurement Interval |
| --- | --- |
| Worker Thread A | 100% |
| Worker Thread B | 100% |
| Worker Thread C | 100% |
| Grabage Collector Thread | 1% |

406

|  | Weighted Fraction of Thread Accesses From Node 0 | Weighted Fraction of Thread Accesses From Node 1 | Weighted Fraction of Thread Accesses From Node 2 |
| --- | --- | --- | --- |
| Worker Thread A | 100% | 0% | 0% |
| Worker Thread B | 2% | 98% | 0% |
| Worker Thread C | 71% | 29% | 0% |
| Grabage Collector Thread | 0% | 0% | 1% |
| Aggregate Per Node | 173% | 127% | 1% |

MEMORY DISTRIBUTION ACROSS MULTIPLE NON-UNIFORM MEMORY ACCESS NODES

CROSS REFERENCES TO RELATED APPLICATIONS

The present application is a continuation of application Ser. No. 14/193,811, filed on Feb. 28, 2014, the entire content of which is hereby incorporated by reference herein.

BACKGROUND

The present disclosure generally relates to improving memory distribution across multiple processing nodes that have non-uniform memory access. Non-uniform memory access nodes ("NUMA nodes") typically include multiple processors or processing units and a local memory including several memory banks, which are located near the multiple processors in the NUMA node. Thus, each processor typically has some memory located nearby, which provides a low memory access latency, or a fast memory access response, and some memory is further away, which provides a higher memory access latency, or a slower memory access response. Generally, it is beneficial to appropriately distribute and/or re-distribute memory for processes across NUMA nodes to optimize processing performance. For example, it is typically ideal to run a process on a processing unit (e.g., a CPU core) that is near the process's memory bank, or alternatively, to move the process's memory to a memory bank near the processing unit where the process is running. Thus, the process may access the nearby memory bank with low memory access latency, thereby increasing processing speed. However, when a process is handled in a distributed manner across multiple NUMA nodes, it can be difficult to determine an optimal memory distribution.

SUMMARY

The present disclosure provides a new and innovative system, methods and apparatus for determining memory distribution across multiple non-uniform memory access nodes. In an example embodiment, an apparatus includes processing nodes, each including processing units and main memory serving as local memory. A bus connects the processing nodes, connecting the processing units of each processing node to a different main memory of a different processing node as shared memory. Access to local memory has a lower memory access latency than access to shared memory. The processing nodes execute threads distributed across the processing nodes, and detect memory accesses made from each processing node for each thread. The processing nodes determine locality values for the thread that represent the fraction of memory accesses made from the processing nodes, and determine processing time values for the threads for a sampling period. The processing nodes determine weighted locality values for the threads, and determine a memory distribution across the processing nodes based on the weighted locality values.

Additional features and advantages of the disclosed method and apparatus are described in, and will be apparent from, the following Detailed Description and the Figures.

BRIEF DESCRIPTION OF THE FIGURES

FIG. 4 is an example data architecture, according to an example embodiment of the present disclosure.

DETAILED DESCRIPTION OF EXAMPLE EMBODIMENTS

Figure 1:
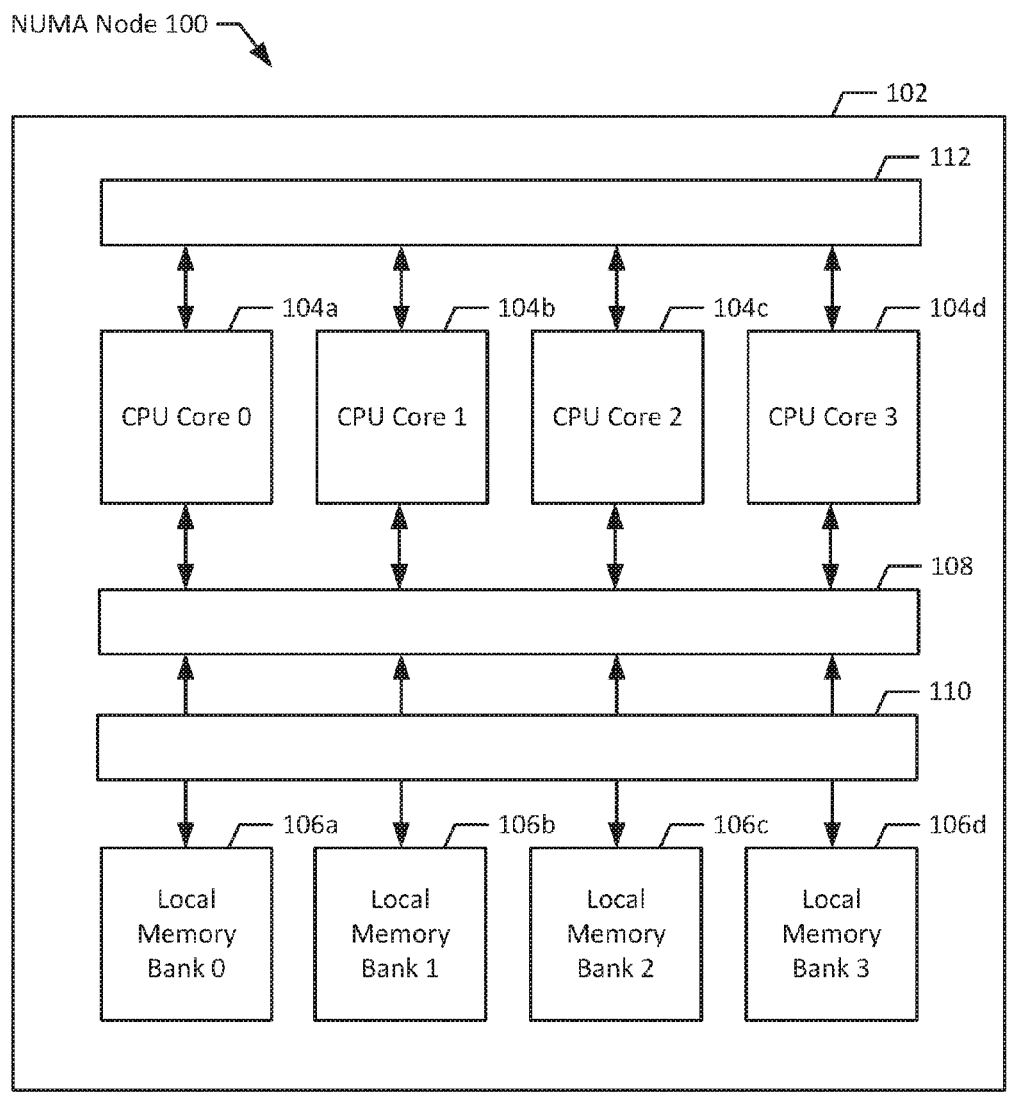
FIG. 1 is a block diagram of an example processing node, according to an example embodiment of the present disclosure.

FIG. 1 is a block diagram of an example processing node, according to an example embodiment of the present disclosure. The illustrated processing node is an example non-uniform memory access node ("NUMA node") 100. The NUMA node 100 may be implemented as a microprocessor chip or integrated circuit. For example, the NUMA node 100 may be a quad-core processor 102, which has four CPU cores 104a, 104b, 104c, 104d, or central processing units. As discussed within the present application, the CPU cores 104a, 104b, 104c, 104d may be referred to individually, or may be referred to collectively as CPU cores 104. In the present example, the CPU cores 104 connect to local memory banks 106a, 106b, 106c, 106d through the memory controller 108 and memory bus 110. As discussed within the present application, the local memory banks 106a, 106b, 106c, 106d may be referred to collectively as the local memory banks 106 or simply as local memory. The CPU cores 104 will typically include a limited amount of fast memory, such as registers and cache memory (not illustrated). The local memory banks 106 may be random access memory (RAM) which operates as the main memory for the quad-core processor 102. The local memory banks 106 are characterized as local memory because, when the CPU cores 104 make a memory access request to the local memory banks 106, the memory access latency is relatively low, so the request is handled relatively fast from the nearby local memory banks 106. In contrast, when the CPU cores 104 make a memory access request via the internode bus interface 112 to memory outside of the NUMA node 100 (e.g., memory located in a different NUMA node), the memory access latency is higher, so the request is handled slower. For example, local memory may typically be approximately 20% faster than shared memory of a different NUMA node 100, although, many factors may impact memory access latency times. In another example, local memory may be approximately twice as fast as shared memory. Thus, the memory access latency is not uniform between the local memory banks 106 and memory located outside the NUMA node 100. The illustrated embodiment shows a quad-core processor 102, however, a NUMA node 100 may include any number of processing units. For example, a NUMA node 100 may typically include a dual-core processor, a hexa-core processor, or an octo-core processor. Further, multi-core processors may include tens or even hundreds of cores, which provide a large NUMA node 100.

Figure 2:
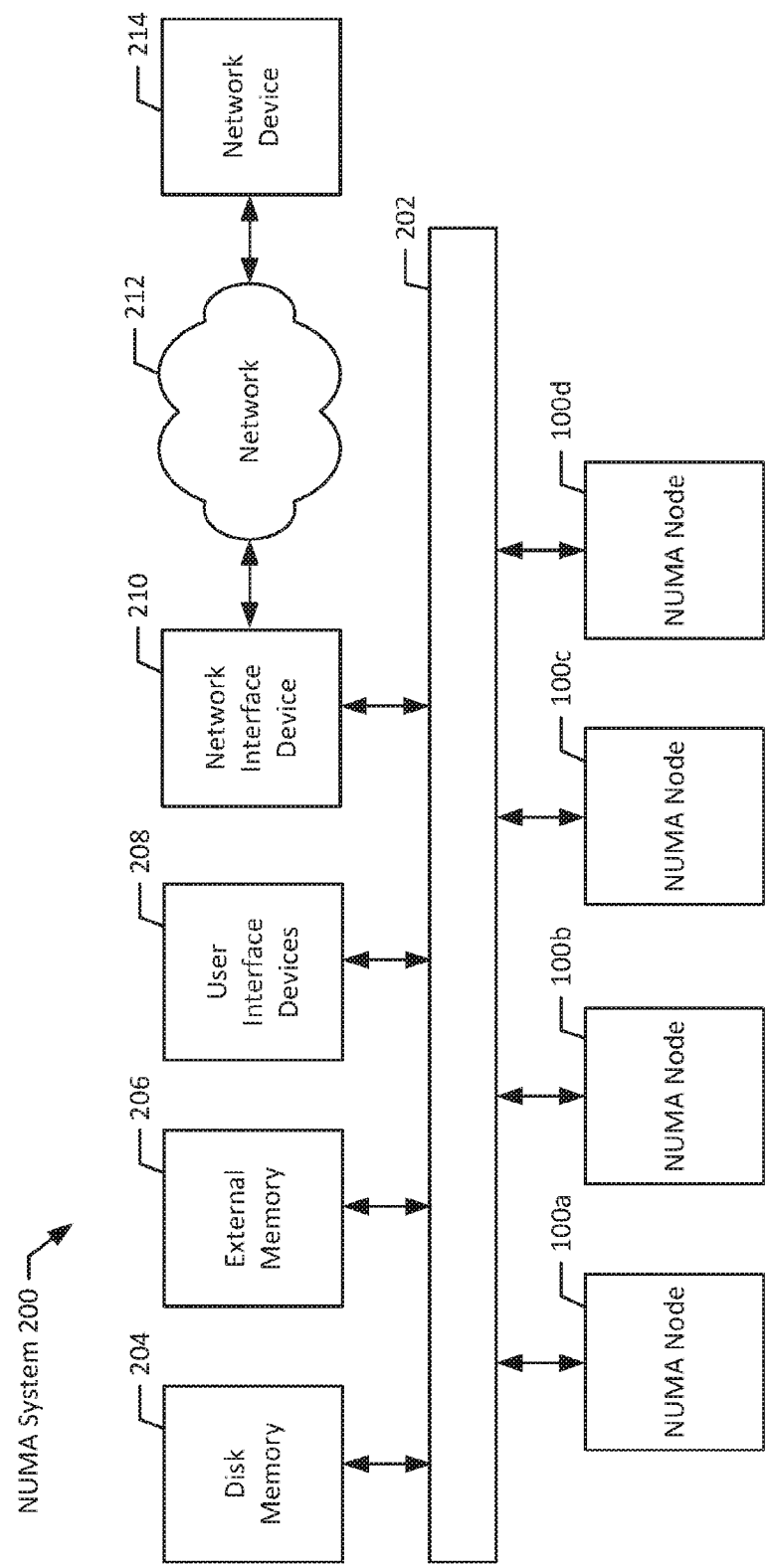
FIG. 2 is a block diagram showing an example of a system including multiple processing nodes, according to an example embodiment of the present disclosure.

FIG. 2 is a block diagram showing an example of a system including multiple processing nodes, according to an example embodiment of the present disclosure. The illustrated system is an example NUMA system 200, which includes four NUMA nodes 100a, 100b, 100c, 100d, which are connected to each other via bus 202. As discussed within the present application, the NUMA nodes 100a, 100b, 100c, 100d may be referred to individually, or collectively as NUMA nodes 100. The bus 202 also connects the NUMA nodes 100 to disk memory 204 (e.g., hard disk drive), external memory 206 (e.g., optical disk, memory card, flash drive, magnetic disk), and user interface devices 208 (e.g., keyboard, mouse, touch screen, display device, speaker, microphone). The bus 202 also connects to the network interface device 210 (e.g., Ethernet connection), which is coupled, via the network 212 (e.g., the Internet), to a network device 214 (e.g., a server computer).

A NUMA system 200 may include any number of NUMA nodes 100 that provide local memory and shared memory. The NUMA node 100a includes local memory banks 106 which provide local memory to the CPU cores 104 in NUMA node 100a, and likewise, the NUMA node 100b includes local memory banks 106 which provide local memory to the CPU cores 104 in NUMA node 100b. When the CPU cores 104 in NUMA node 100a make a request to access memory in the local memory banks 106 in NUMA node 100b, the local memory banks 106 in NUMA node 100b provide the CPU cores 104 in NUMA node 100a with shared memory, rather than local memory. As discussed within the present patent application, local memory is memory that is within a NUMA node 100, while shared memory is memory that is in a different NUMA node 100. Generally, accessing shared memory will have greater latency than local memory. Thus, it is generally preferable for a process or thread executing on a CPU core 104 to use only local memory and not use any shared memory. However, when a process is too large to execute within one NUMA node 100, threads of the process can execute on different NUMA nodes 100. Thus, it is generally impractical for a process or threads executing across different NUMA nodes 100 to use only local memory and not use any shared memory. Accordingly, memory distribution among the different NUMA nodes 100 impacts the processing speed, and a memory distribution that maximizes memory accesses to local memory is generally preferable to a memory distribution that has fewer memory access to local memory and more memory accesses to shared memory. However, determining an optimal memory distribution can be difficult.

A memory distribution that spreads out the memory based on a number of memory accesses made from each NUMA node 100 may be ineffective or even counterproductive. Due to the overhead involved in sampling memory accesses, only a small portion of memory accesses may be detected. For example, memory access sampling may only detect approximately 1 in every 1,000,000 memory accesses. Accordingly, it is typical for commonly accessed memory to have one detected access for several million actual memory accesses, while rarely accessed memory may have one detected access for only one thousand actual memory accesses. For many typical processes, many detected memory accesses are not from parts of a process that are actually doing the work of the process, but instead by parts of the process that do maintenance (e.g., a garbage collector). For example, the worker threads of a process may exhibit spatial and temporal locality and concentrate memory accesses on a small number of areas of memory, while a garbage collector thread may access memory all over several different NUMA nodes. Accordingly, as discussed below in more detail in relation to FIG. 4, the worker threads may have relatively few detected memory accesses, while a garbage collector thread may have many more detected memory accesses than the worker threads.

In the NUMA system 200, the NUMA nodes 100 use the memory distributed amongst the NUMA nodes 100, and may also access memory in the disk memory 204, the external memory 206, and/or via the network 212 (e.g., the Internet, a local area network, a wide area network). However, the disk memory 204, external memory 206, and the network 212 typically have far greater memory access latency than both local memory and shared memory (e.g., several orders of magnitude slower response times). The NUMA system 200 may be implemented in any type of computer system that includes NUMA nodes 100, including a server computer or a client computer. Further, the NUMA system 200 may be embodied in hardware and virtual environments, as physical hardware processing nodes and virtual machine implemented processing nodes both benefit from employing the presently disclosed methods. In an example embodiment, the NUMA system 200 may be performing cloud computing, and be part of "the cloud." The data stored in local memory may include any type of data, such as documents, files, programs, web applications, web pages, etc.

Figure 3:
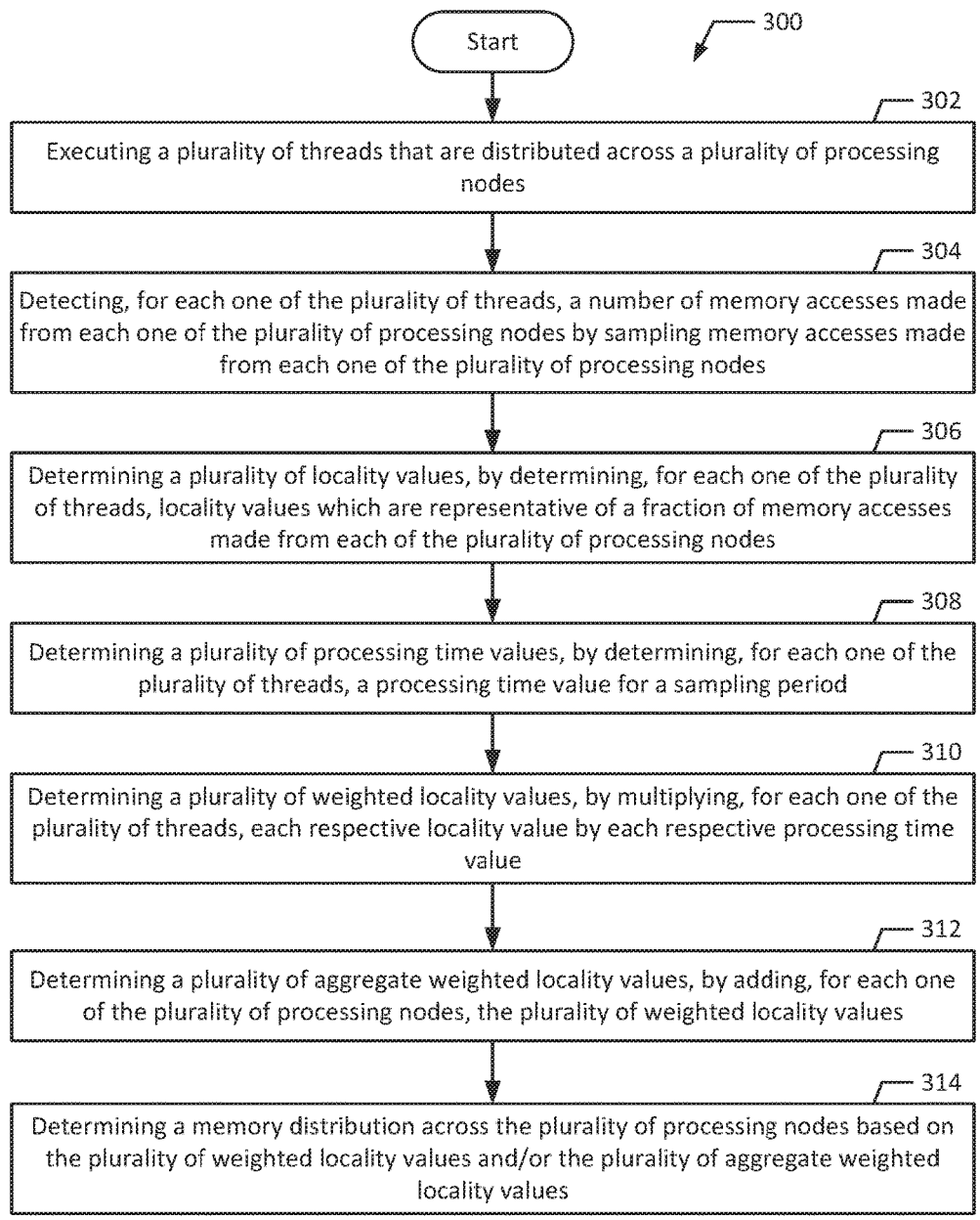
FIG. 3 a flowchart illustrating an example process for distributing memory across multiple processing nodes, according to an example embodiment of the present disclosure.

FIG. 3 a flowchart illustrating an example process for determining a memory distribution across multiple processing nodes, according to an example embodiment of the present disclosure. Although the process 300 is described with reference to the flowchart illustrated in FIG. 3, it will be appreciated that many other methods of performing the acts associated with the process 300 may be used. For example, the order of some of the blocks may be changed, certain blocks may be combined with other blocks, and some of the blocks described are optional.

The example process 300 may begin with executing a plurality of threads that are distributed across a plurality of processing nodes (block 302). For example, three worker threads may be executing in a first NUMA node 100a and two worker threads may be executing in a second NUMA node 100b. For example, if NUMA node 100a is a quad-core processor 102, CPU core 104a, CPU core 104b, and CPU core 104c may each execute one worker thread, so all three worker threads are operating in parallel. Likewise, NUMA node 100b may execute two worker threads, which may be the same worker threads or different worker threads as those executing at NUMA node 100a. When the same worker threads are executed on separate NUMA nodes 100a and 100b, it is advantageous to have an optimal memory distribution between NUMA nodes 100a and 100b, and any other NUMA nodes 100 that are executing any part of the relevant process(es). The worker threads perform the actual work of the process being handled, but other types threads are typically required for many programs and processes. For example, a garbage collector thread, which frees unused memory, may be operating on NUMA node 100c. Typically, when processes are too large to optimally be executed within a single NUMA node 100, threads of the process are distributed across multiple NUMA nodes and executed.

The NUMA system 200 detects, for each one of the plurality of threads, a number of memory accesses made from each one of the plurality of processing nodes by sampling memory accesses made from each one of the plurality of processing nodes (block 304). For example, when three worker threads and a garbage collector thread are executing on three different NUMA nodes 100a, 100b, 100c, the NUMA system 200 samples memory accesses at each NUMA node 100 to detect how many memory accesses are made from each thread, at each NUMA node, over a period of time, referred to herein as a sampling period or a measurement interval. Although only a small portion of total memory access are detected by the sampling, the detected number of accesses may generally indicate how often each thread, at each NUMA node, makes a memory access to local memory or shared memory. FIG. 4, which is discussed below, provides an example of sampled memory accesses by each thread at each NUMA node.

The NUMA system 200 determines a plurality of locality values, by determining, for each one of the plurality of threads, locality values which are representative of a fraction of memory accesses made from each of the plurality of processing nodes (block 306). For example, for each thread, a total number of detected memory accesses across all NUMA nodes 100 is determined by adding up detected accesses at each NUMA node 100. Then, the number of detected memory accesses at each respective NUMA node 100 is used to determine a locality value, for example, by dividing memory accesses at each individual NUMA node 100 by the total number of memory accesses across all NUMA nodes 100 for each worker thread. A locality value may be a percentage, a fraction, a ratio, or any suitable representation of relative memory accesses from each NUMA node for each thread. FIG. 4 provides an example of locality values expressed as percentages.

The NUMA system 200 determines a plurality of processing time values, by determining, for each one of the plurality of threads, a processing time value for a sampling period (block 308). For example, the processing time or CPU time of each thread, during a sampling period or measurement interval, is determined. A processing time value may be a percentage, a fraction, a ratio, or any suitable representation of processing time or CPU time of each thread during the sampling period or measurement interval (e.g., 1 second, 1 minute). FIG. 4 provides an example of processing time values expressed as percentages. In an example embodiment, the processing time or CPU time of each CPU core 104, in each NUMA node 100, is determined for each thread. As discussed in further detail below, in this example, it is not necessary to detect the number of memory accesses made from each thread at each NUMA node 100.

The NUMA system 200 may then determine a plurality of weighted locality values, by multiplying, for each one of the plurality of threads, each respective locality value by each respective processing time value (block 310). For example, the locality values of each thread, at each NUMA node 100, are multiplied by the respective CPU time of that thread. Further, in an example embodiment, the weighted locality values may be determined according to a control model, which may use higher order calculations, feed forward control, or any other suitable manner of numerically determining weighted locality values based on the locality values and the processing time values. FIG. 4 provides an example of weighted locality values expressed as percentages. In an example embodiment, a plurality of weighted locality values may be determined based on the processing time or CPU time of each CPU core 104, in each NUMA node 100, for each thread. A plurality of weighted locality values may be based on the detected number of memory access in each NUMA node 100 for each thread and the CPU time of each respective thread and/or based on the CPU time of each CPU core 104, in each NUMA node 100, for each respective thread.

The NUMA system 200 may next determine a plurality of aggregate weighted locality values, by adding, for each one of the plurality of processing nodes, the plurality of weighted locality values (block 312). For example, the weighted locality values of each NUMA node 100 may be added together and/or averaged together. In an example embodiment, the weighted locality values may be determined according to a control model, which may use higher order calculations, feed forward control, or any other suitable manner of numerically determining aggregate weighted locality values for each NUMA node 100. For example, aggregate weighted locality values may be determined using a weighted moving average, in which the current weighted locality values from the current sampling period are aggregated with previous weighted locality values from previous sampling periods at a diminished weight, according to a predefined weighted moving average. One or more previous sets of weighted locality values or sampling periods may be used in a weighted moving average. For example, current weighted locality values of the current sampling period may have a first weight, with the weighted locality values from the last sampling period having half the first weight, and the weighted locality values from the previous sampling period having one quarter of the first weight. FIG. 4 provides an example of aggregate weighted locality values expressed as percentages.

The NUMA system 200 determines a memory distribution across the plurality of processing nodes based on the plurality of weighted locality values and/or the plurality of aggregate weighted locality values (block 314). For example, the aggregate weighted locality values may indicate that memory should be distributed among NUMA nodes 100 that do not have a majority of memory accesses. As discussed below in regard to FIG. 4, distributing memory according to the aggregate weighted locality values may seem counterintuitive based on the number of memory accesses from the NUMA nodes. However, using the aggregate weighted locality values to determine memory distribution should advantageously improve processing efficiency by optimally reducing memory access latency. When the NUMA system 200 determines that memory distribution should be changed, appropriate portions of the memory to be re-distributed may be transferred from local memory banks 106 in a first NUMA node 100a to local memory banks 106 in a second NUMA node 100b. It may be particularly advantageous to employ the example process 300 to each process in a group processes which are executing simultaneously using shared memory, where each process in the group includes multiple threads.

FIG. 4 illustrates an example data architecture, which provides example data for a NUMA system 200 that includes three NUMA nodes 100a (Node 0), 100b (Node 1), 100c (Node 2), which are executing a process that includes four threads, which are worker thread A, worker thread B, worker thread C, and garbage collector thread. For example, Node 0, Node 1, and Node 2 are each quad-core processors 102. Node 0 is executing worker thread A, worker thread B, and worker thread C, Node 1 is executing worker thread B, and worker thread C, and Node 2 is executing only the garbage collector thread. Because all of the threads are part of a single process, much of the same memory may be used by multiple different threads operating on different NUMA nodes 100.

As illustrated in the example data of database 402, according to sampling performed during a sampling period or measurement interval, worker threads A, B, and C may have memory accesses at Node 0 and Node 1 of, for example: worker thread A has {1,000; 0}; worker thread B has {20; 1,000}; and worker thread C has {1,000; 400}. Also, the garbage collector thread may have 100,000 accesses from Node 2. As illustrated in database 402, the aggregate number of total memory accesses made from each of the NUMA nodes 100 that are executing the worker threads A, B, and C, Node 0 (e.g., 2,020) and Node 1 (e.g., 1,400), are much lower than the aggregate number of total memory accesses made from Node 2 (e.g., 100,000), which executes the garbage collector thread. For example, the aggregated number of detected memory accesses may indicate that the worker threads A, B, and C may access memory at a rate of less than 100 megabytes per second, while a garbage collector thread may access memory at a rate of greater than 1 gigabyte per second. Accordingly, the absolute values of memory accesses from each NUMA node 100 would indicate that the memory should be distributed heavily on Node 2. However, the worker threads A, B, and C are performing the actual work of the process, while the garbage collector thread is not. Accordingly, using absolute values of detected memory accesses to determine memory distribution would typically result in a suboptimal memory distribution, by causing greater latency in the worker threads A, B, and C.

As illustrated in the example data of database 404, locality values for each thread indicate which NUMA nodes 100 are making memory accesses for each thread during a given measurement interval. For example, 100% of detected memory accesses for worker thread A are made from Node 0. For worker thread B, 2% of memory accesses are made from Node 0 and 98% of memory accesses are made from Node 1. For worker thread C, 71% of memory accesses are made from Node 0 and 29% of memory accesses are made from Node 1. For the garbage collector thread, 100% of memory accesses are made from Node 2. The aggregate of the determined locality values is 173% for Node 0; 127% for Node 1; and 100% for Node 2. A memory distribution based on these aggregated locality values would result in memory being spread across Node 0, Node 1, and Node 2. However, using these aggregated locality values does not provide an optimal memory distribution because the worker threads A, B, and C are all executing only on Node 0 and Node 1.

As illustrated in the example data of database 406, processing time values or CPU times are provided for each thread during a measurement interval. For example all of worker threads A, B, and C are operating at 100% CPU time. Thus, between the CPU cores 104 on Node 0 and Node 1, each of the worker threads A, B, and C are executing at 100% CPU time. On the other hand, the garbage collector thread executing on Node 2 is operating at 1% CPU time. The example CPU times provided in FIG. 4 provide a typical scenario, however, the CPU time of each thread may be any wide range of values depending on each particular application.

As illustrated in the example data of database 408, weighted locality values for each thread indicate which NUMA nodes 100 are making memory accesses weighted by the processing time values or CPU time of each thread during a measurement interval. For example, because all of worker threads A, B, and C were operating at 100% CPU time across Node 0 and Node 1, the weighted locality values remain the same as the locality values, however, because the garbage collector thread was operating at only 1% CPU time on Node 2, the weighted locality value is only 1%. Thus, the aggregate weighted locality values are 173% for Node 0; 127% for Node 1; and 1% for Node 2. The aggregate weighted locality values for Node 0 and Node 1 are far greater than the aggregate weighted locality value for Node 2, even though many more detected memory accesses are made from Node 2. However, the worker threads A, B, and C, which are operating only on Node 0 and Node 1, and the aggregate weighted locality values reflect that Node 0 and Node 1 are the heavily used NUMA nodes 100 for the example process. As explained above, it is generally preferable to access local memory rather than shared memory, which has greater latency than local memory. Using aggregate weighted locality values as disclosed in this application may advantageously optimize memory distribution resulting in relatively more memory accesses to local memory and less memory accesses to shared memory.

The data of FIG. 4 is provided for example purposes only to clearly illustrate the concepts described above. Determining optimal memory distribution may generally become more difficult as processes include more threads and/or more NUMA nodes 100, and as groups of multiple processes each including multiple threads are simultaneously operated on the same NUMA nodes 100. Also, when threads may operate not at high CPU times, at or near 100%, or at low CPU times, at or near 0% or 1%, determining optimal memory distribution may generally become more difficult. However, the presently disclosed system and method advantageously provide stable and useful information for determining memory distribution for programs or processes distributed across multiple NUMA nodes 100, which include varying numbers of threads, which access differing amounts of memory and use differing amounts of CPU time.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus comprising:
 a plurality of processing nodes, each including a plurality of processing units and a main memory; and
 a bus connected to the plurality of processing nodes, the bus configured to connect the plurality of processing units of each processing node to a different main memory, wherein the plurality of processing nodes are configured to:
  detect, for each one of a plurality of threads that are distributed across the plurality of processing nodes, a number of memory accesses made from each one of the plurality of processing nodes by sampling memory accesses made from each one of the plurality of processing nodes,
  determine a plurality of locality values, by determining, for each one of the plurality of threads, locality values which are representative of a fraction of memory accesses made from each of the plurality of processing nodes,
  determine a plurality of processing time values, by determining, for each one of the plurality of threads, a processing time value for a sampling period, determine a plurality of weighted locality values, by using, for each one of the plurality of threads, each respective locality value and each respective processing time value, and distributing memory across the plurality of processing nodes based on the plurality of weighted locality values.

2. The apparatus of claim 1, wherein the plurality of processing nodes includes at least:

a first processing node including at least a first processing unit, a second processing unit, and a first memory device that is connected as local memory to the first processing unit and the second processing unit, and a second processing node including at least a third processing unit, a fourth processing unit, and a second memory device that is connected as local memory to the third processing unit and the fourth processing unit, and wherein the bus is configured to connect the first processing node to the second memory device as shared memory and connect the second processing node to the first memory device as shared memory.

3. The apparatus of claim 1, wherein at least one of the plurality of processing nodes is a dual-core processor, a quad-core processor, a hexa-core processor, or an octo-core processor.

4. The apparatus of claim 1, wherein the plurality of processing nodes includes at least four processing nodes.

5. The apparatus of claim 1, wherein the plurality of processing nodes are further configured to:

determine a plurality of aggregate weighted locality values, by adding, for each one of the plurality of processing nodes, the plurality of weighted locality values, wherein the memory distribution across the plurality of processing nodes is determined based on the plurality of aggregate weighted locality values.

6. The apparatus of claim 5, wherein the plurality of threads includes a first worker thread, a second worker thread, and a third garbage collector thread, and wherein the plurality of aggregate weighted locality values includes a first aggregate weighted locality value, which corresponds to a first node executing the first worker thread, a second aggregate weighted locality value, which corresponds to a second node executing the second worker thread, and a third aggregate weighted locality value, which corresponds to a third node executing the garbage collector thread.

7. The apparatus of claim 6, wherein a first aggregate number of total memory accesses of the third node is greater than each of a second aggregate number of total memory accesses of the first node and a third aggregate number of total memory accesses of the second node, and wherein each of a first aggregate weighted locality value of the first node and a second aggregate weighted locality value of the second node are greater than, by at least two orders of magnitude, a third aggregate weighted locality value of the third node.

8. The apparatus of claim 6, wherein a first aggregate number of total memory accesses of the third node is greater than, by at least an order of magnitude, each of a second aggregate number of total memory accesses of the first node and a third aggregate number of total memory accesses of the second node, and wherein each of a first aggregate weighted locality value of the first node and a second aggregate weighted locality value of the second node are greater than, by at least an order of magnitude, a third aggregate weighted locality value of the third node.

9. The apparatus of claim 5, wherein determining the plurality of aggregate weighted locality values includes determining a weighted moving average.

10. The apparatus of claim 1, wherein the plurality of processing nodes are further configured to:

determine, for each one of the plurality of threads, processing time values at each of the plurality of processing nodes.

11. The apparatus of claim 1, wherein the locality values are percentages of total memory accesses across the plurality of processing nodes.

12. The apparatus of claim 1, wherein the processing time values are percentages of total processing time of the plurality of processing nodes.

13. The apparatus of claim 1, wherein the plurality of threads includes a plurality of worker threads and a garbage collector thread.

14. The apparatus of claim 13, wherein each one of the plurality of worker threads accesses memory at a first rate of less than 100 megabytes per second, and the garbage collector thread accesses memory at a second rate of greater than 1 gigabyte per second.

15. The apparatus of claim 13, wherein the garbage collector thread operates at a lower processing time than each respective worker thread of the plurality of worker threads.

16. The apparatus of claim 13, wherein the garbage collector thread operates at a processing time which is in a range of 0% to 1%.

17. The apparatus of claim 13, wherein the plurality of worker threads includes a first worker thread and a second worker thread, and a first number of memory accesses of the garbage collector thread is greater than, by at least two orders of magnitude, each of a second number of memory accesses of the first worker thread from a first node and a third number of memory accesses of the second worker thread from a second node.

18. The apparatus of claim 1, wherein a process includes the plurality of threads, a group of processes includes the process, and each process in the group accesses shared memory.

19. A method comprising:

detecting, for each one of a plurality of threads that are distributed across a plurality of processing nodes, a number of memory accesses made from each one of the plurality of processing nodes by sampling memory accesses made from each one of the plurality of processing nodes;

determining a plurality of locality values, by determining, for each one of the plurality of threads, locality values which are representative of a fraction of memory accesses made from each of the plurality of processing nodes;

determining a plurality of processing time values, by determining, for each one of the plurality of threads, a processing time value for a sampling period;

determining a plurality of weighted locality values, by using, for each one of the plurality of threads, each respective locality value and each respective processing time value; and distributing memory across the plurality of processing nodes based on the plurality of weighted locality values.

20. A non-transitory computer readable medium storing instructions which, when executed, cause a plurality of processing nodes to:
- detect, for each one of a plurality of threads that are distributed across the plurality of processing nodes, a number of memory accesses made from each one of the plurality of processing nodes by sampling memory accesses made from each one of the plurality of processing nodes,
- determine a plurality of locality values, by determining, for each one of the plurality of threads, locality values which are representative of a fraction of memory accesses made from each of the plurality of processing nodes,
- determine a plurality of processing time values, by determining, for each one of the plurality of threads, a processing time value for a sampling period,
- determine a plurality of weighted locality values, by using, for each one of the plurality of threads, each respective locality value and each respective processing time value, and
- distributing memory across the plurality of processing nodes based on the plurality of weighted locality values.

* * * * *